US010800030B1

(12) United States Patent
Cui et al.

(10) Patent No.: US 10,800,030 B1
(45) Date of Patent: Oct. 13, 2020

(54) MOBILE WORK STATION WITH VERSATILE TOOL HANDLER ARM

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

( * ) Notice: Subject to any disclaimer, the term of this patent is extended or adjusted under 35 U.S.C. 154(b) by 0 days.

(21) Appl. No.: 15/931,121

(22) Filed: May 13, 2020

(51) Int. Cl.
| | |
|---|---|
| *B62B 3/00* | (2006.01) |
| *B25J 5/00* | (2006.01) |
| *B25J 18/00* | (2006.01) |
| *B62D 3/02* | (2006.01) |
| *B62B 5/00* | (2006.01) |

(52) U.S. Cl.
CPC .............. *B25J 5/007* (2013.01); *B25J 18/00* (2013.01); *B62B 3/00* (2013.01); *B62B 3/008* (2013.01); *B62D 3/02* (2013.01); *B62B 5/004* (2013.01)

(58) Field of Classification Search
CPC ............................ B62B 3/0606; B62B 3/0631
USPC ......................................................... 414/917
See application file for complete search history.

(56) References Cited

U.S. PATENT DOCUMENTS

| | | | | | |
|---|---|---|---|---|---|
| 2,792,139 | A | * | 5/1957 | Lloyd .................... | B60B 29/002 414/428 |
| 4,365,925 | A | | 12/1982 | Girtz | |
| 5,375,963 | A | * | 12/1994 | Wohlwend .............. | B66C 23/48 212/203 |
| 5,456,564 | A | * | 10/1995 | Bianchini ................. | B60P 3/07 414/462 |
| 5,536,135 | A | * | 7/1996 | Robertson ............ | B65G 47/912 414/728 |
| 8,186,931 | B2 | * | 5/2012 | Borntrager .............. | B62D 51/04 414/490 |

(Continued)

FOREIGN PATENT DOCUMENTS

| | | |
|---|---|---|
| DE | 3017811 A1 | 11/1981 |
| DE | 102008029082 A1 | 12/2009 |

(Continued)

OTHER PUBLICATIONS

"i-Swim One Portable Pool Lift"; printed on Apr. 20, 2020 from https://www.dolphinstairliftseatanglia.com/i-swim-one-portable-pool-lift/.

*Primary Examiner* — Jonathan Snelting
(74) *Attorney, Agent, or Firm* — Nath, Goldberg & Meyer; Richard C. Litman

(57) ABSTRACT

The mobile work station with versatile tool handler arm is a mobile work station that carries a tool handler arm that can manipulate a tool in multiple global degrees of freedom. The work station has a base housing mounted on a plurality of wheels. A vertical post is mounted on top of the base housing, the vertical post having relative rotation to the base housing. An elongate tool handler arm is pivotally mounted medially at the top of the vertical post, the tool handler arm being defined by a 4-bar linkage including an upper link, a lower link, and front and rear crank blocks pin-jointed together. An elongate handlebar connected to the rear end of the tool provides control of the tool handler, and a tool carrier attached to the front end allows selective attachment of any one of a variety of tools.

17 Claims, 11 Drawing Sheets

(56) References Cited

U.S. PATENT DOCUMENTS

| | | | | |
|---|---|---|---|---|
| 8,382,419 B2* | 2/2013 | Agoncillo | ................. | B66F 9/18 |
| | | | | 414/546 |
| 9,789,902 B1 | 10/2017 | Cui et al. | | |
| 10,450,175 B2* | 10/2019 | Mast | ......................... | B66F 1/04 |
| 2001/0026756 A1* | 10/2001 | Mortimore | ............ | B60P 1/4442 |
| | | | | 414/556 |
| 2018/0295769 A1 | 10/2018 | Friggstad | | |

FOREIGN PATENT DOCUMENTS

| | | | |
|---|---|---|---|
| FR | 2925389 | A1 | 8/2009 |
| IT | 1195899 | B | 10/1988 |
| KR | 101437137 | B1 | 9/2014 |

\* cited by examiner

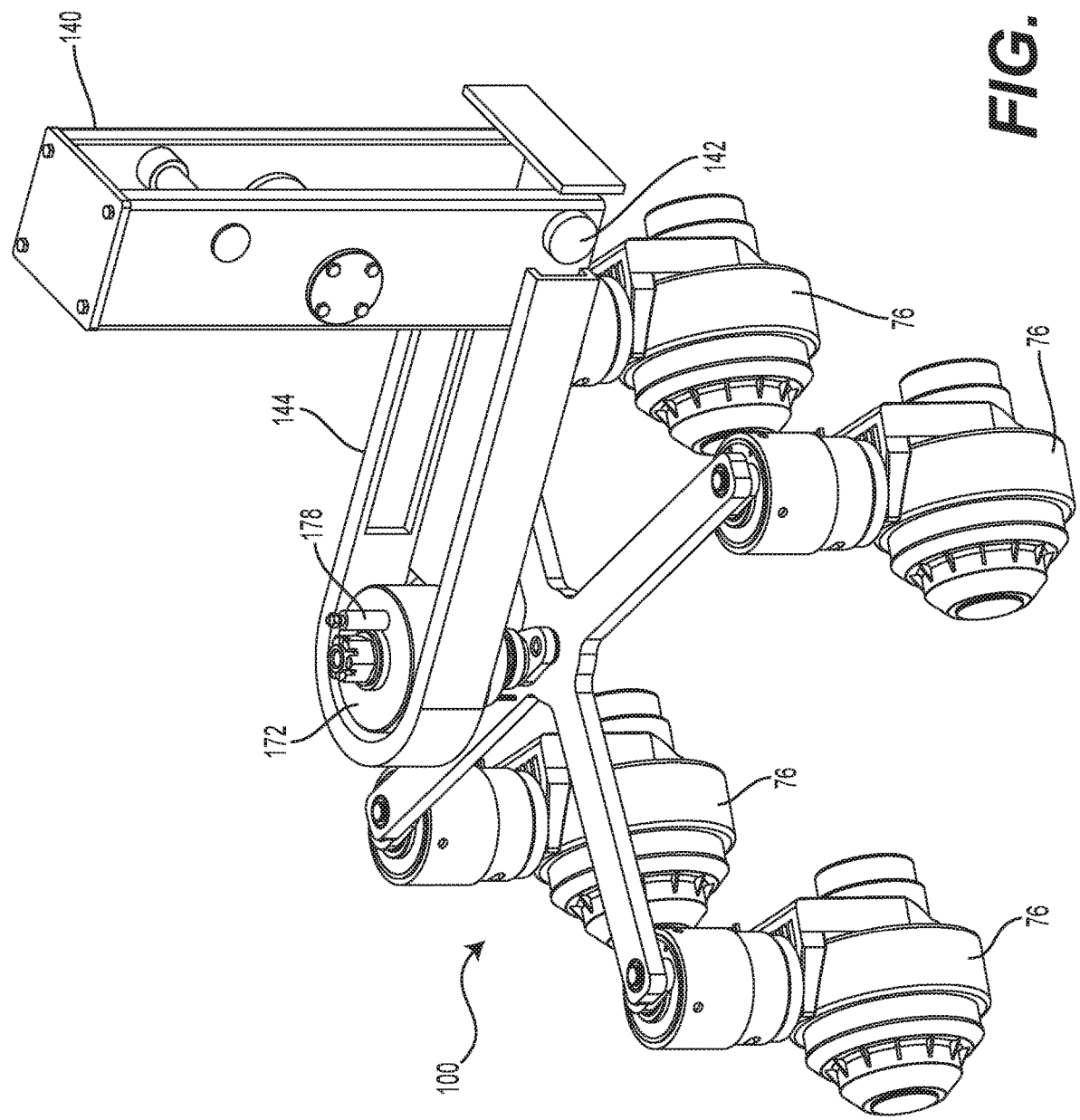

MOBILE WORK STATION WITH VERSATILE TOOL HANDLER ARM

BACKGROUND

1. Field

The disclosure of the present patent application relates to mobile work stations, and particularly to a mobile work station with versatile tool handler arm, wherein the tool handler arm is operable in multiple degrees of freedom to translate or rotate a tool or load in any required direction, the tool handler arm being mounted on a mobile base for transporting the arm to any required location at a job site.

2. Description of the Related Art

Although a wide variety of lifting and carrying devices for tools are used throughout many different industries, such devices are typically limited in the number of degrees of freedom through which the tools are handled. A conventional jack is an example of such devices and is designed to simply provide mechanical, hydraulic, pneumatic or electromechanical assistance in vertical lifting. Any additional manipulation of the tool, such as rotation, must be performed manually.

Further, although such lifting and carrying devices are often mounted on wheels for portability, the loads they carry are often both heavy and unbalanced. Thus, the ability to steer the device is not only convenient, but becomes necessary for providing stability. Although steering systems for lifting and carrying devices are known, they are typically similar to the steering systems associated with two-wheel drive vehicles, and thus do not provide simultaneous steering for all wheels of the device. Given the heavy and unbalanced loads often carried by such devices, particularly in industrial settings, it is desirable to have simultaneous turning of the wheels in order to provide optimal stability for the device. Thus, a mobile work station with versatile tool handler arm solving the aforementioned problems is desired.

SUMMARY

The mobile work station with versatile tool handler arm is a mobile work station that carries a tool handler arm that can manipulate a tool in multiple global degrees of freedom. The work station has a base housing mounted on a plurality of wheels. A vertical post is mounted on top of the base housing, the vertical post having relative rotation to the base housing. An elongate tool handler arm is pivotally mounted medially at the top of the vertical post, the tool handler arm being defined by a 4-bar linkage including an upper link, a lower link, and front and rear crank blocks pin-jointed together. An elongate handlebar connected to the rear end of the tool provides control of the tool handler, and a tool carrier attached to the front end allows selective attachment of any one of a variety of tools.

The lower link of the tool handler arm is supported at the front and rear crank blocks and at the vertical post by trunnion mounts that define two axes of rotation perpendicular to each other so that a control operator may pivot or seesaw the tool handler arm at the vertical post to raise and lower the tool carrier as needed, and so that the control operator may rotate the lower link about an axis parallel to the longitudinal axis of the tool handler to rotate the tool mounted on the tool carrier if and when needed. The handlebar is attached to the rear end of the lower link and the tool carrier is attached to the front end of the lower link by universal joints to facilitate rotation of the lower link and to prevent the tool from tilting forward or backward relative to vertical when the front end of the tool handler arm is raised or lowered. In some embodiments, the vertical post may have roller mounted in a guide track so that the tool handler arm may also be capable of translation from front to rear on top of the base housing.

One or more of the wheels may be powered wheels, or the wheels may be non-powered wheels. The base housing may house a steering assembly having a Steering Rotation Synchronizer including a steering linkage that rotates all of the wheels simultaneously. The steering assembly includes an electric motor for power-assisted steering, or the vertical post may be locked to the Steering Rotation Synchronizer by a spring lock for manual steering by the control operator using the handlebar.

A variety of tools may be mounted on the tool carrier. For example, the tool may be forks for lifting material, drill augers for planting trees, robotic hands for gripping hazardous or dangerous materials, pots for carrying molten metals in foundries or mills, etc.

These and other features of the present subject matter will become readily apparent upon further review of the following specification.

BRIEF DESCRIPTION OF THE DRAWINGS

FIG. 11 is a perspective view of the vertical post of FIG. 10, shown mounted on the steering assembly of FIGS. 3 and 4.

Similar reference characters denote corresponding features consistently throughout the attached drawings.

DETAILED DESCRIPTION OF THE PREFERRED EMBODIMENTS

Figure 1:
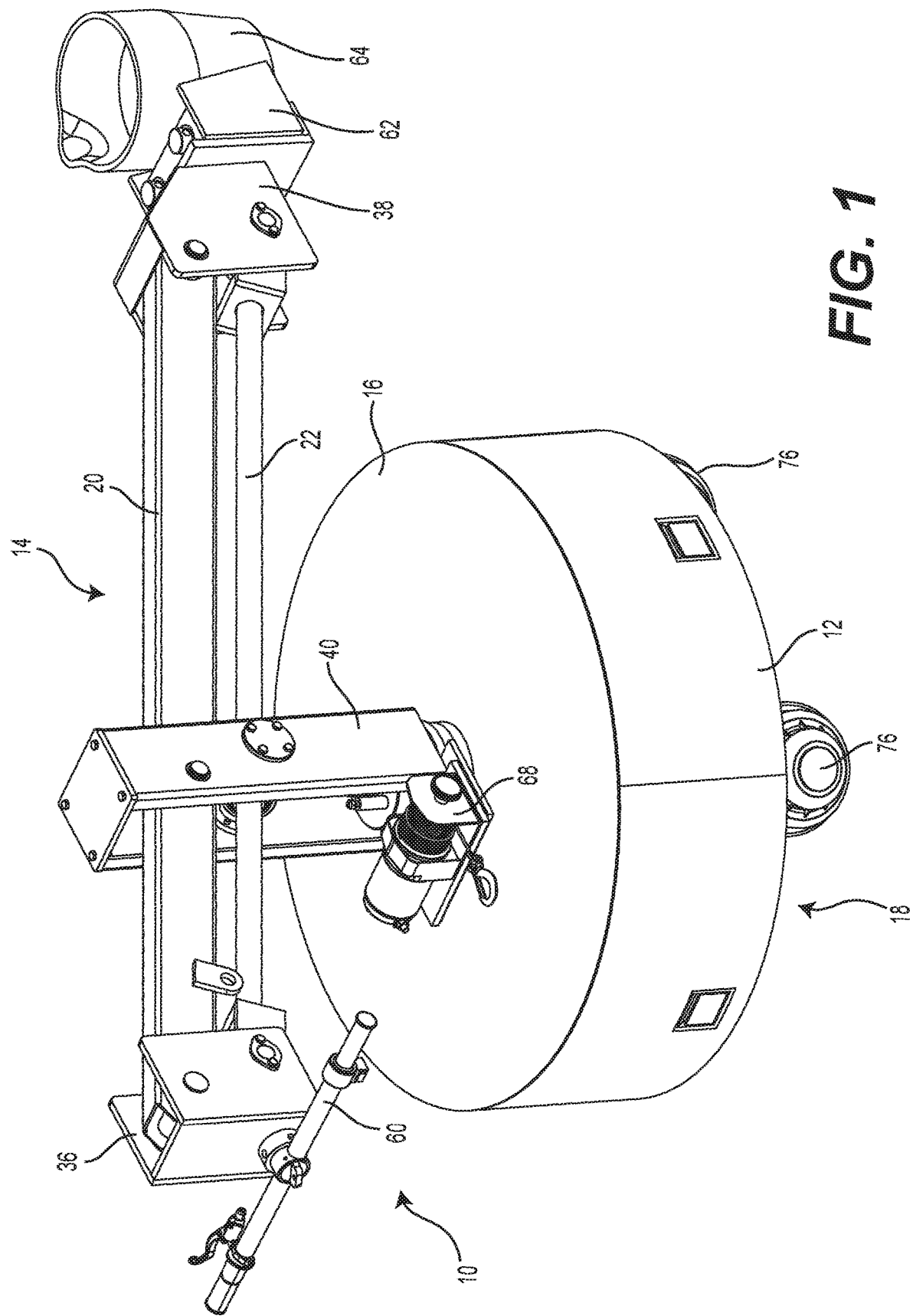
FIG. 1 is a perspective view of a mobile work station with versatile tool handler arm.

Referring to FIG. 1, the mobile work station with versatile tool handler arm designated generally as 10 in the drawings, is a mobile work station that carries a tool handler arm that can manipulate a tool 64 in multiple global degrees of freedom. In FIG. 1, tool 64 is shown as a conventional foundry ladle or melting pot; however, it should be understood that the foundry pot 64 is shown for exemplary purposes only, and as will be described in greater detail below, a variety of different tools may be interchanged using a releasable tool carrier 62 mounted on tool handler arm 14.

Figure 2:
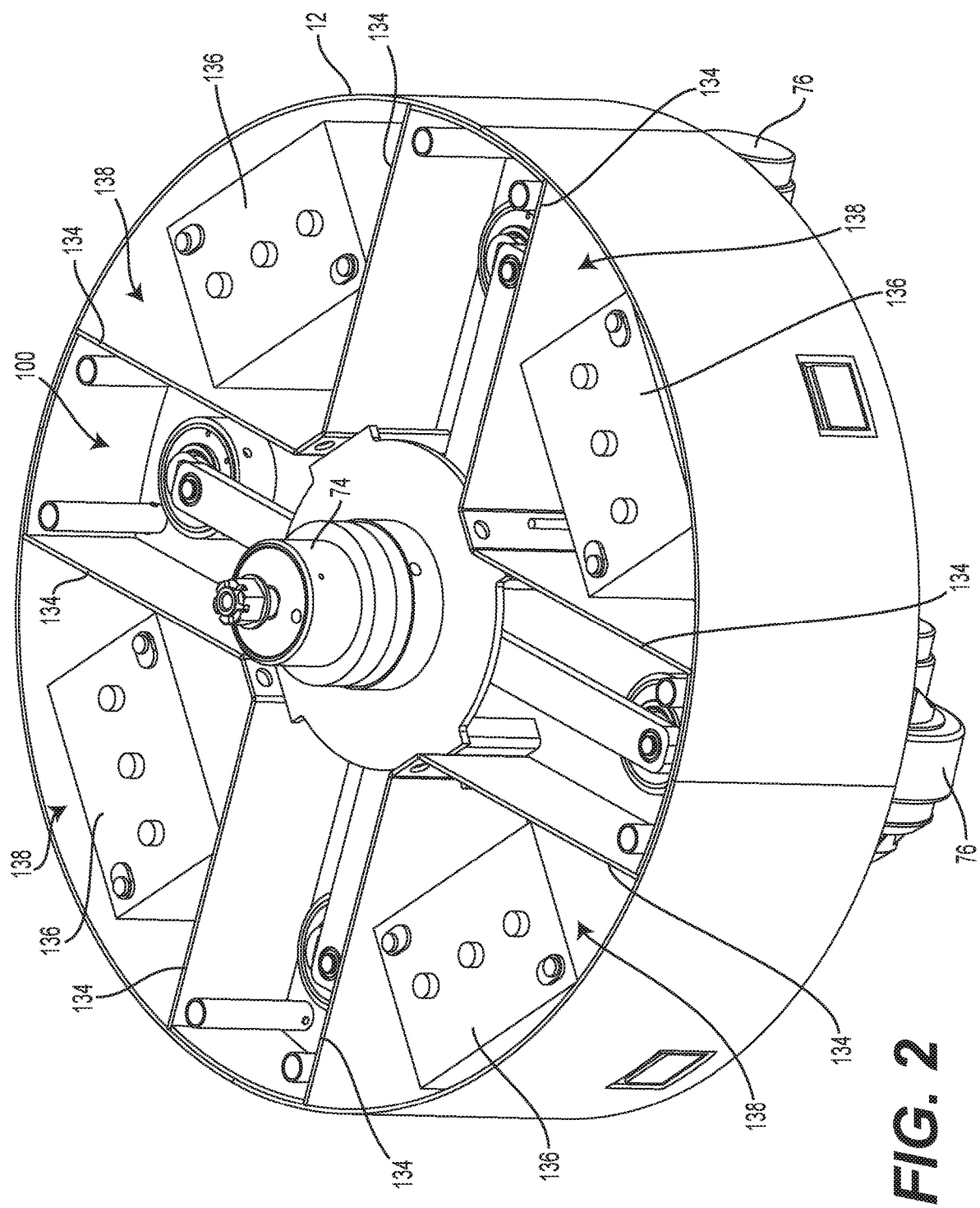
FIG. 2 is a perspective view of the base housing of the mobile work station of FIG. 1, shown with the top of the housing removed.

The mobile work station 10 includes a base housing 12 having a top wall 16 and a bottom wall 18, the tool handler arm 14 being mounted on the top wall 16. In FIGS. 1 and 2, the base housing 12 is shown as being cylindrical. However, it should be understood that the dimensions and configuration of the base housing 12 shown in FIGS. 1 and 2 are exemplary only. As shown in FIG. 2, a plurality of partition walls 134 may divide the interior of the base housing 12 into a plurality of compartments 138 for carrying accessories, such as batteries 136 or the like. It should be understood that the batteries 136 shown in FIG. 2 are exemplary, and the compartments 138 may store other tools or accessories.

As shown in FIGS. 6-9, the tool handler arm 14 is mounted on a vertical post 40 that is rotatable on the base housing 12, and the tool handler arm 14 is medially pivotal about a horizontal axis at the top of the vertical post 40. The tool 64 carried by the tool handler arm 14 can be further axially rotated with respect to a four-bar parallelogram linkage defined by the tool handler arm 14. The tool handler arm 14 includes an upper bar or link 20 having opposed first and second ends 24, 26, respectively; a lower bar or link 22, also having opposed first and second ends 28, 30, respectively; a first crank block 36; and a second crank block 38. The upper link 20 and the lower link 22 are equal in length, and the first crank block 36 and the second crank block 38 are equal in length. The respective first ends 24, 28 of the upper and lower links 20, 22 are pivotally attached to the first crank block 36, and the respective second ends 26, 30 of the upper and lower links 20, 22 are pivotally attached to the second crank block 38. The upper and lower links 20, 22 and the first and second crank blocks 36, 38 define the four-bar parallelogram linkage of the tool handler arm 14.

Figure 6:
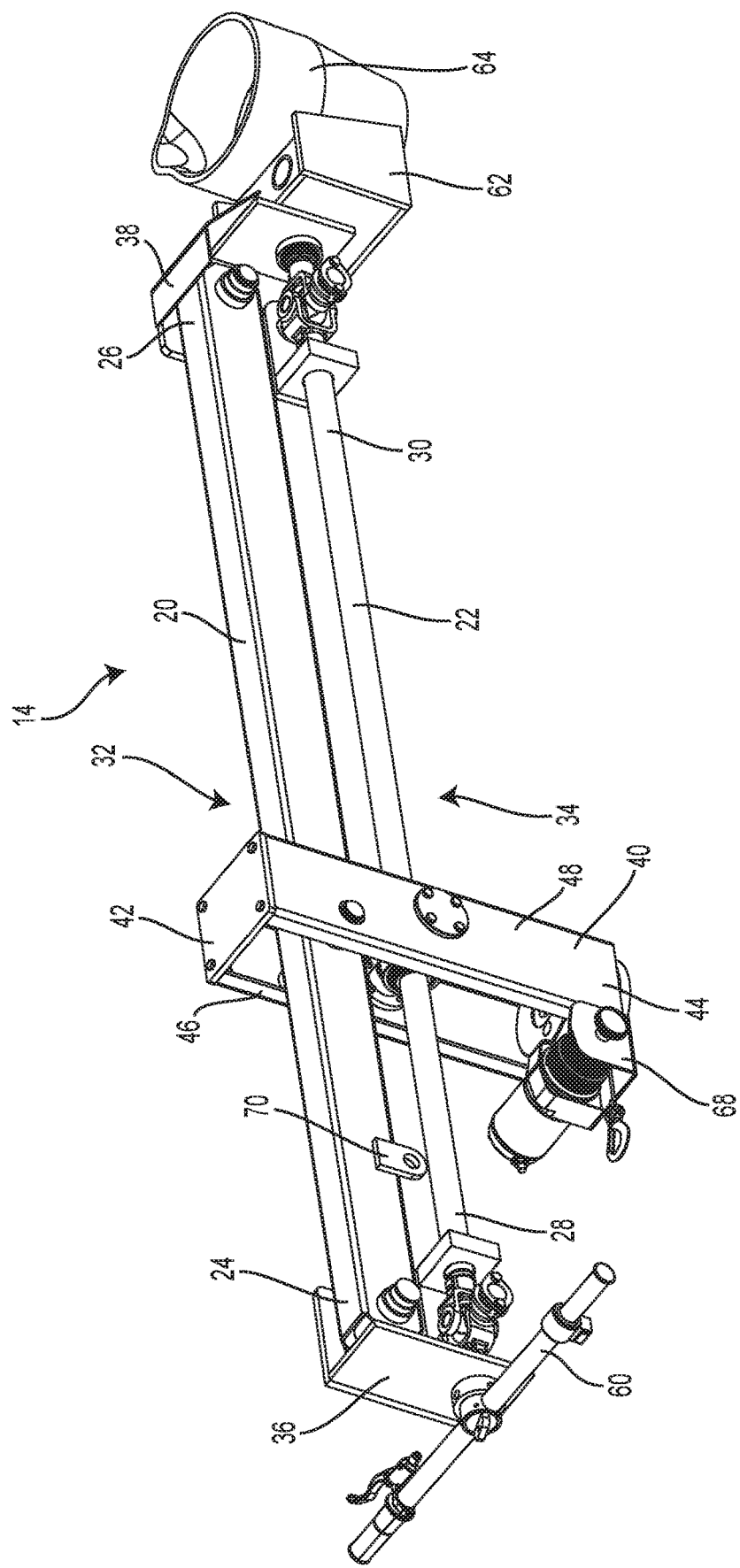
FIG. 6 is a perspective view of the tool handler arm of the mobile work station of FIG. 1, shown with a foundry ladle or pot attached to the tool carrier.
Figure 7:
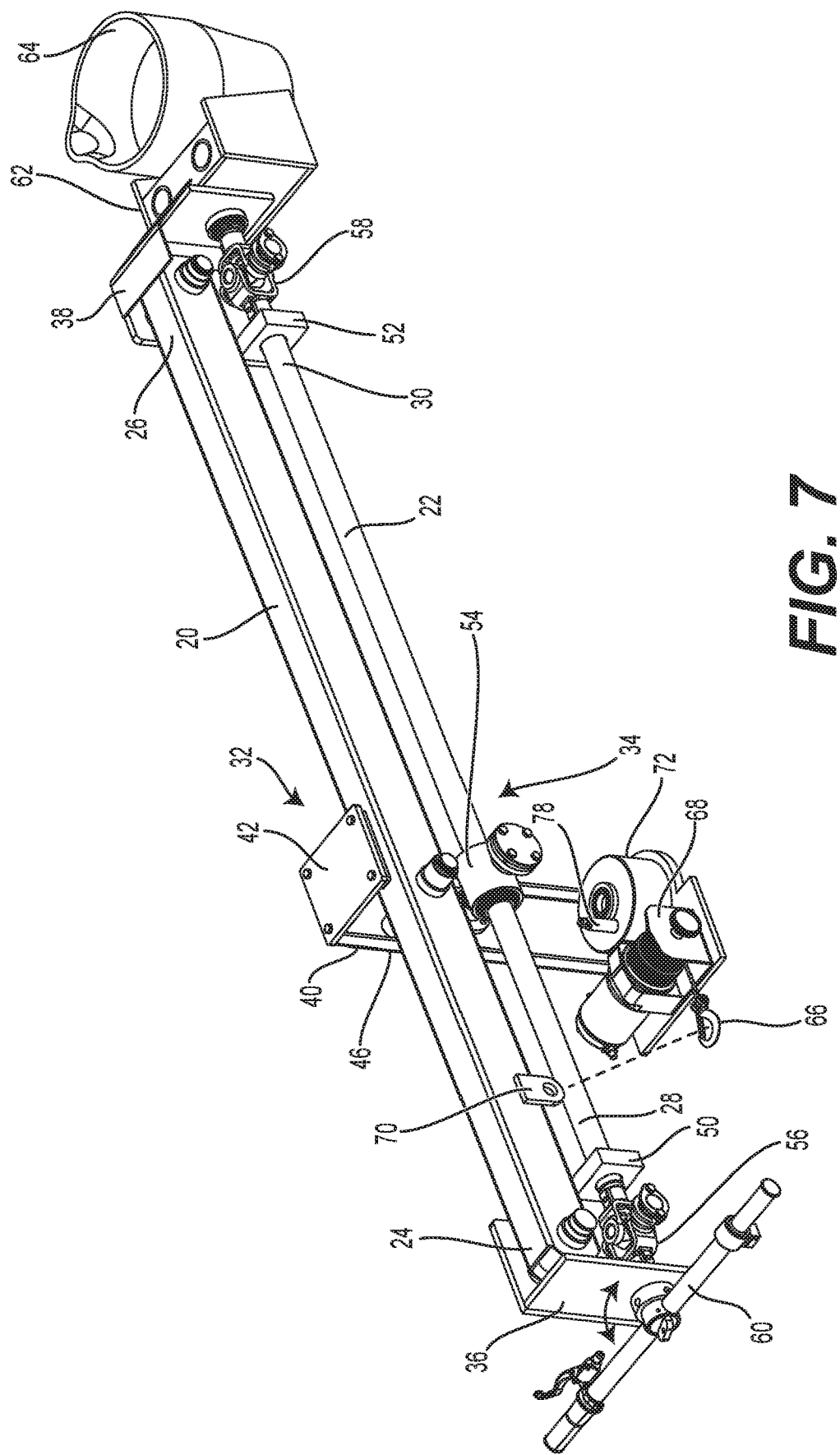
FIG. 7 is a perspective view of the tool handler arm of FIG. 6, shown with a sidewall of the vertical post removed.
Figure 8:
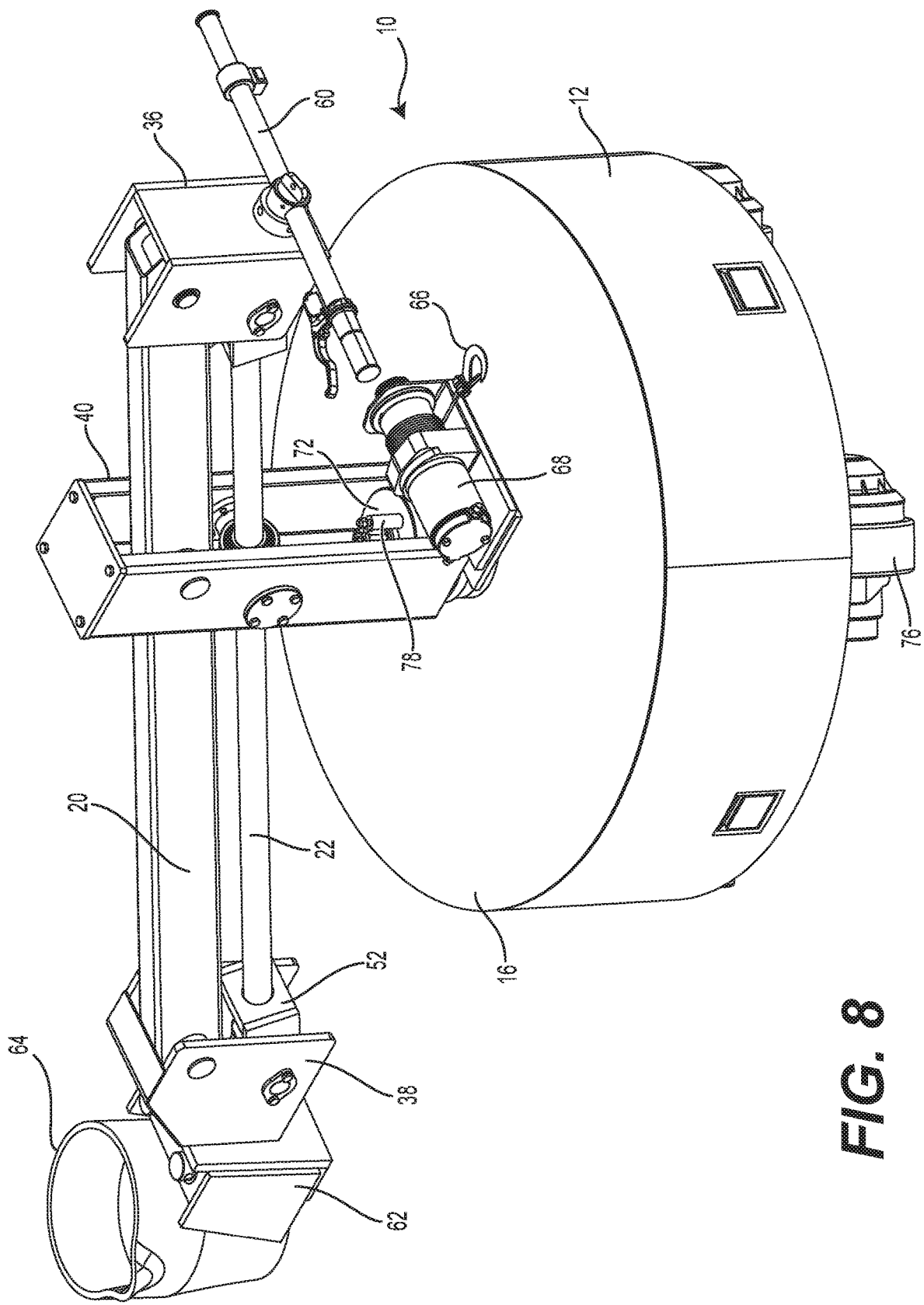
FIG. 8 is a perspective view of the mobile work station of FIG. 1, shown with the tool carrier end of the tool handler arm lowered.

The vertical post 40 has opposed upper and lower ends 42, 44, respectively. The respective central or medial portions 32, 34 of the upper and lower links 20, 22 are pivotally attached to the vertical post 40. The vertical post 40 has opposed first and second sidewalls 46, 48, respectively, with the upper and lower links 20, 22 passing between the sidewalls 46, 48. The lower end 44 of the vertical post 40 is mounted on the top wall 16 of the base housing 12. A tool carrier 62 is mounted on the second crank block 38 for releasably attachment of the tool 64. In FIGS. 6-8, the tool carrier 62 is shown as having a pair of cylindrical bars or pins for engaging corresponding female sockets of the tool 64. However, it should be understood that any suitable type of releasable coupler may be used to releasably attach the tool 64 to the second crank block 38.

As best seen in FIG. 7, a first trunnion mount 50 pivotally attaches the first end 28 of the lower link 22 to the first crank block 36, a second trunnion mount 52 pivotally attaches the second end 30 of the lower link 22 to the second crank block 38, and a third trunnion mount 54 pivotally secures the central or medial portion 34 of the lower link 22 to the vertical post 40. In FIG. 7, the second sidewall 48 of vertical post 40 has been removed for purposes of clarity.

Further, a first universal joint 56 rotationally secures the handlebar 60 to the first crank block 36, and a second universal joint 58 rotationally secures the tool carrier 62 to the second crank block 38. It should be understood that the dimensions and configuration of the handlebar 60 are shown for exemplary purposes only, and that other means for rotating the lower link 22 may be provided. The handlebar 60 is rotationally coupled by the first universal joint 56 (through the first crank block 36) for manually driving rotation of the lower bar 22 (i.e., rotating lower bar 22 about its longitudinal axis). The tool carrier 62 is attached to the second universal joint 58 such that the rotation of the lower bar 22 drives rotation of the tool 64 releasably attached to the tool carrier 62. A winch 68 may be further provided for selectively driving pivotal motion of the tool handler arm 14 with respect to the vertical post 40 about a horizontal axis. A hook 66 may releasably attach the line from the winch 68 to a bracket 70, allowing the winch 68 to be selectively disengaged from the tool handler arm 14. As an alternative to the powered pivoting of the tool handler arm 14, the user may manually pivot the tool handler arm 14 about the horizontal pivot (as well as the vertical axis, as will be described in greater detail below) using the handlebar 60.

Figure 5:
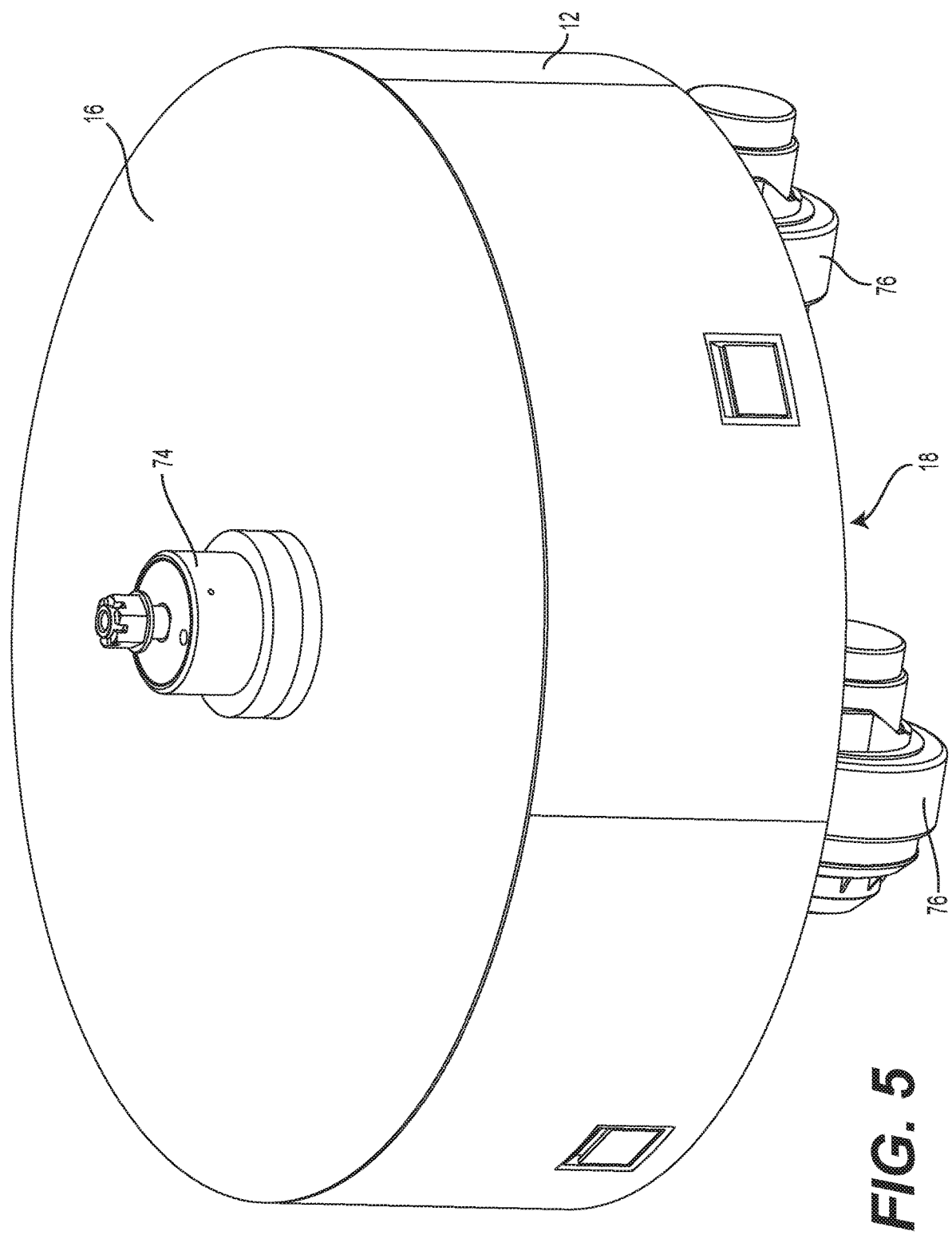
FIG. 5 is a perspective view of the base housing of the mobile work station of FIG. 1, shown with the steering rotation synchronizer extending above the top wall of the base housing the tool handler arm being omitted.
Figure 9:
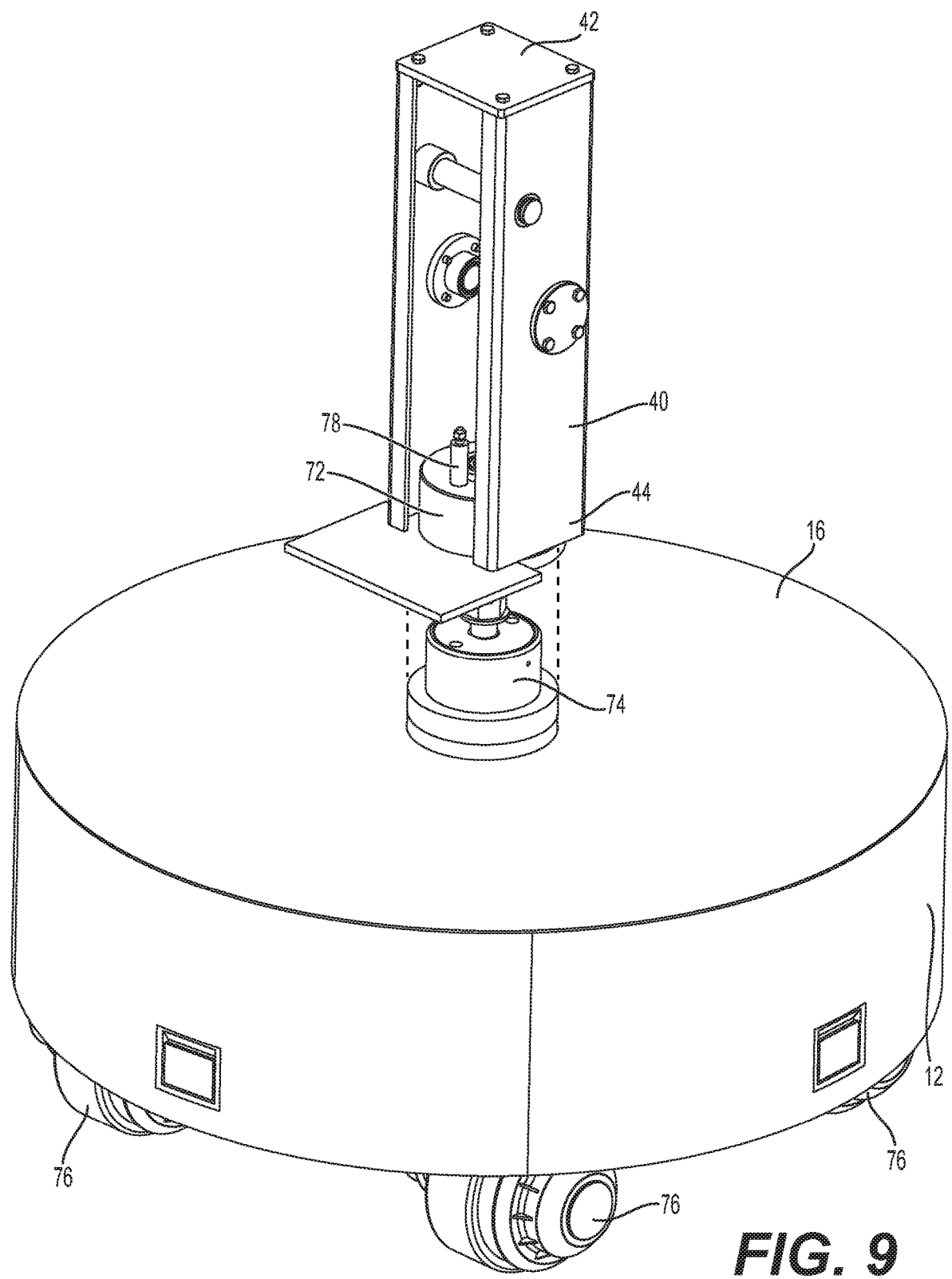
FIG. 9 is a perspective view of the mobile work station of FIG. 1, shown with the vertical post exploded from the base housing and the tool handler arm omitted.

The mobile work station 10 further includes a steering assembly 100 at least partially disposed within the base housing 12, and a plurality of wheels 76 mounted on the bottom wall 16 of the base housing 12 are coupled to the steering assembly 100. As shown in FIGS. 5 and 9, a steering rotation synchronizer 74 may extend above the top wall 16 of the base housing 12. The steering rotation synchronizer 74 is driven to synchronously rotate the plurality of wheels 76 by the steering assembly 100. As shown in FIGS. 7-9, the tool handler arm 14 may include a mating coupler 72 mounted at the lower end 44 of the vertical post 40 for mating with the steering rotation synchronizer 74 for selective rotational coupling between the steering rotation synchronizer 74 and the vertical post 40, thus providing selective drive rotation of the vertical post 40 about the vertical axis. By extension, the steering rotation synchronizer 74 may be used to drive rotation of the tool handler arm 14 about a vertical axis synchronously with the steering of wheels 76. A spring lock pin 78 may be provided for selectively coupling the mating coupler 72 with the steering rotation synchronizer 74.

Figure 3:
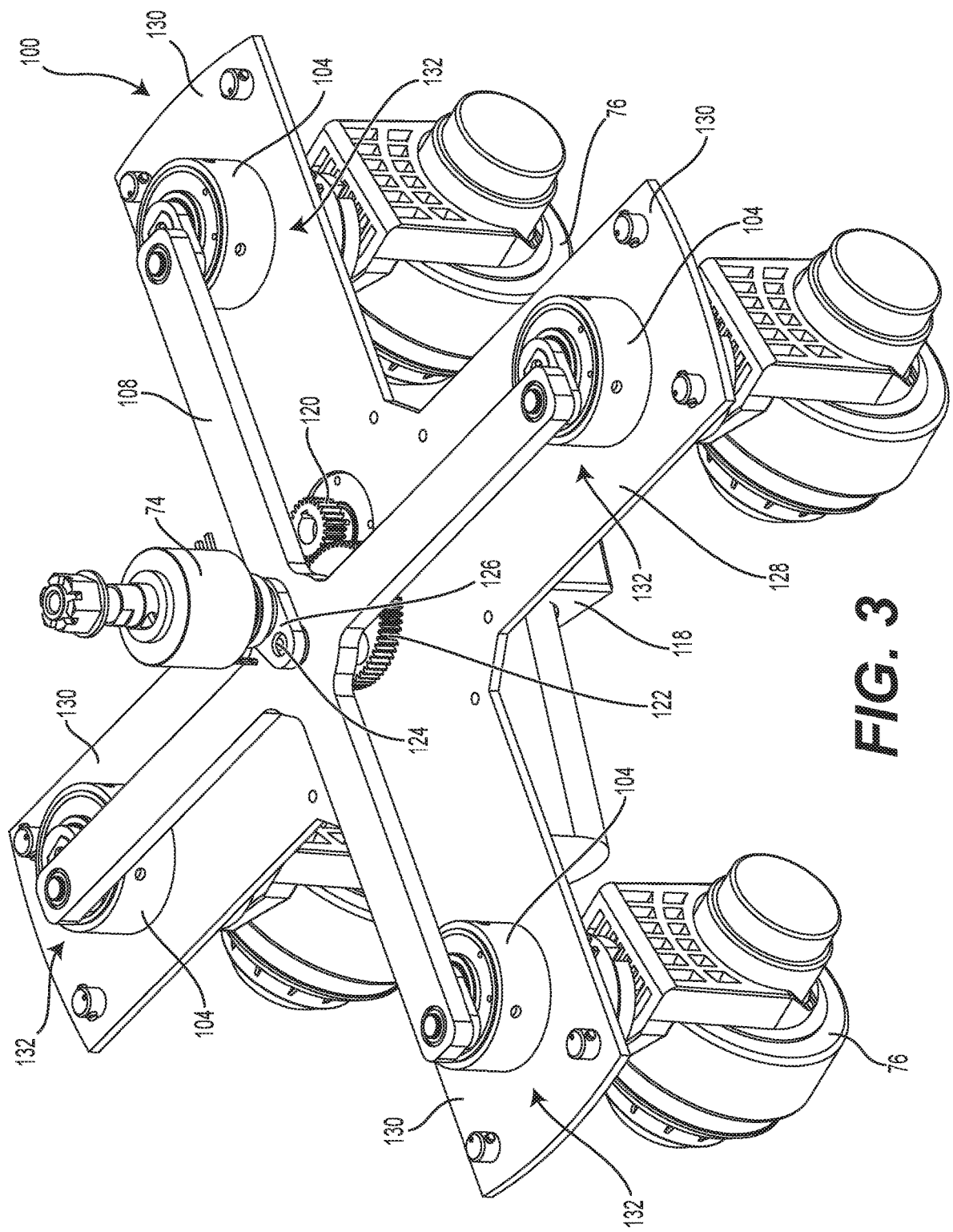
FIG. 3 is a perspective view of a wheel and steering assembly of the mobile work station of FIG. 1, shown with the wheels mounted on a cruciform wheel mounting plate and shown with a steering rotation synchronizer mounted above the steering linkage.
Figure 4:
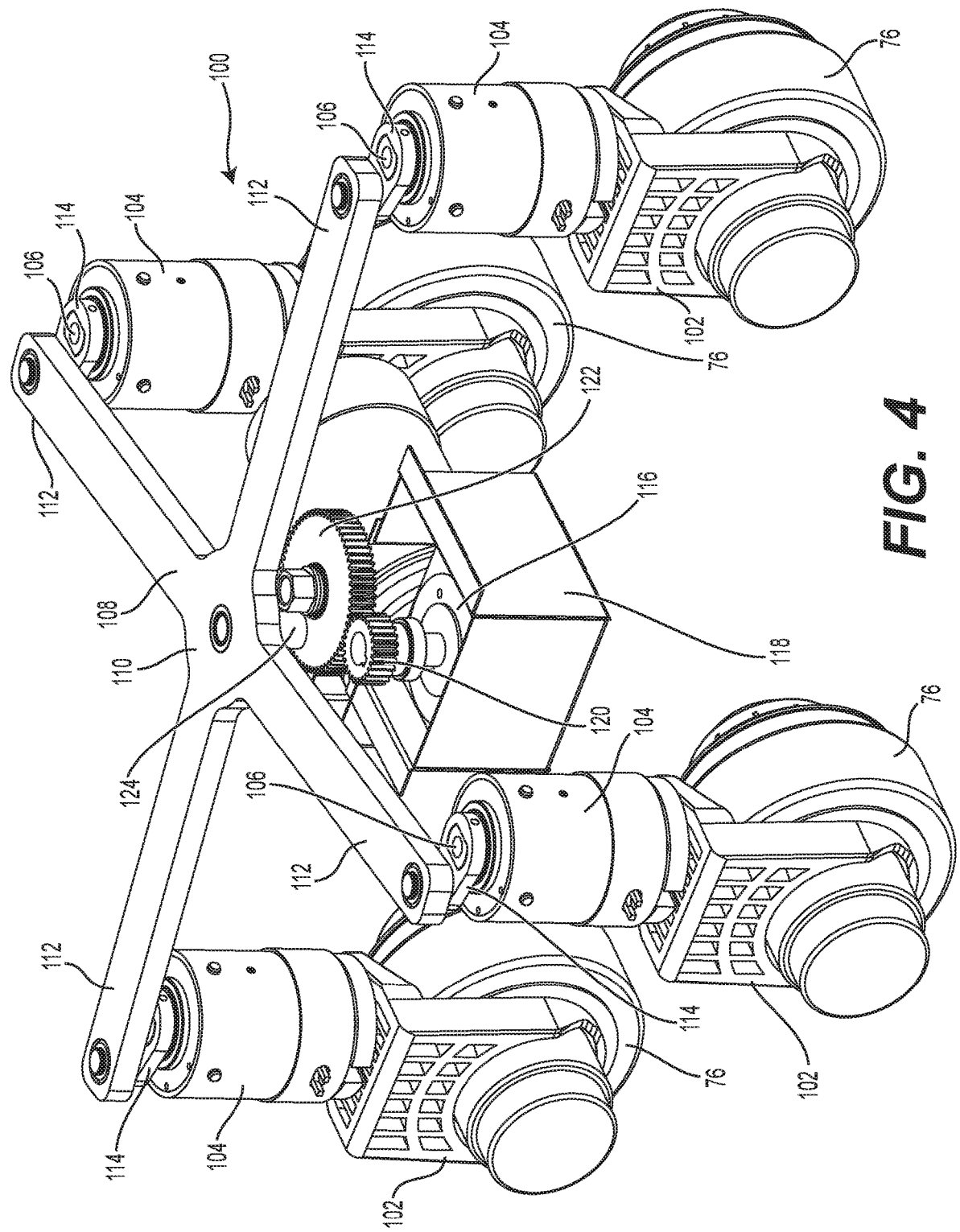
FIG. 4 is a perspective view of the steering assembly of FIG. 3, shown with the wheel mounting plate and the steering rotation synchronizer removed to show details thereof.

As shown in FIGS. 3 and 4, the steering assembly 100 includes a plurality of steering yokes 102 having the wheels 76 mounted thereon. It should be understood that the dimensions and configuration of the wheels 76 are shown for exemplary purposes only. The wheels 76 may be any suitable type of wheels, including, but not limited to, self-driven, motorized wheels. A plurality of electric slip rings 104 are respectively mounted on the plurality of steering yokes 102, and a plurality of kingpins 106 extend axially through the electric slip rings 104.

A cruciform steering linkage 108 is provided, having a plurality of shafts 112 radially extending from a central hub 110. It should be understood that the dimensions and configuration of steering the linkage 108 are shown for exemplary purposes only, and may vary depending upon the particular size and load requirements of the mobile work station 10, as well as the number of wheels 76. A plurality of first crank arms 114 couple respective upper ends of the plurality of kingpins 106 with the plurality of shafts 112 of the steering linkage 108. The eccentric crank pins provided by cranks arms 114 connected to the steering linkage 108 results in smoother turning of the wheels 76 with less power. In order to provide powered steering, a motor 116, which may be mounted within a motor housing 118, is further provided. It should be understood that the dimensions and configuration of the motor housing 118 are shown for exemplary purposes only. Further, it should be understood that the motor 116 may be any suitable type of motor, and may be powered by, for example, batteries 136.

A first pinion gear 120 is driven by the motor 116, and a second gear 122 is meshed with, and driven by, the first gear 120. A synchronizer shaft 124 is eccentrically mounted on the second gear 122 and is coupled to the central hub 110 of the steering linkage 108. As shown in FIG. 3, a second crank arm 126 eccentrically couples the synchronizer shaft 124 with the steering rotation synchronizer 74. A mounting plate 128 may be further provided, having a plurality of arms 130, the wheels 76 being attached to the mounting plate 128. Each arm 130 has an opening 132 formed therethrough for at least partially receiving a corresponding one of the plurality of electric slip rings 104. The second gear 122 is rotatably mounted on the mounting plate 128. As the second gear 122 turns (driven by motor 116), the plurality of wheels 76 will simultaneously turn in the same travelling direction (i.e., the wheels 76 are simultaneously steered through simultaneous rotation about the vertical axis). The steering rotation synchronizer 74 is also simultaneously driven to rotate with the steering rotation of wheels 76.

Figure 10:
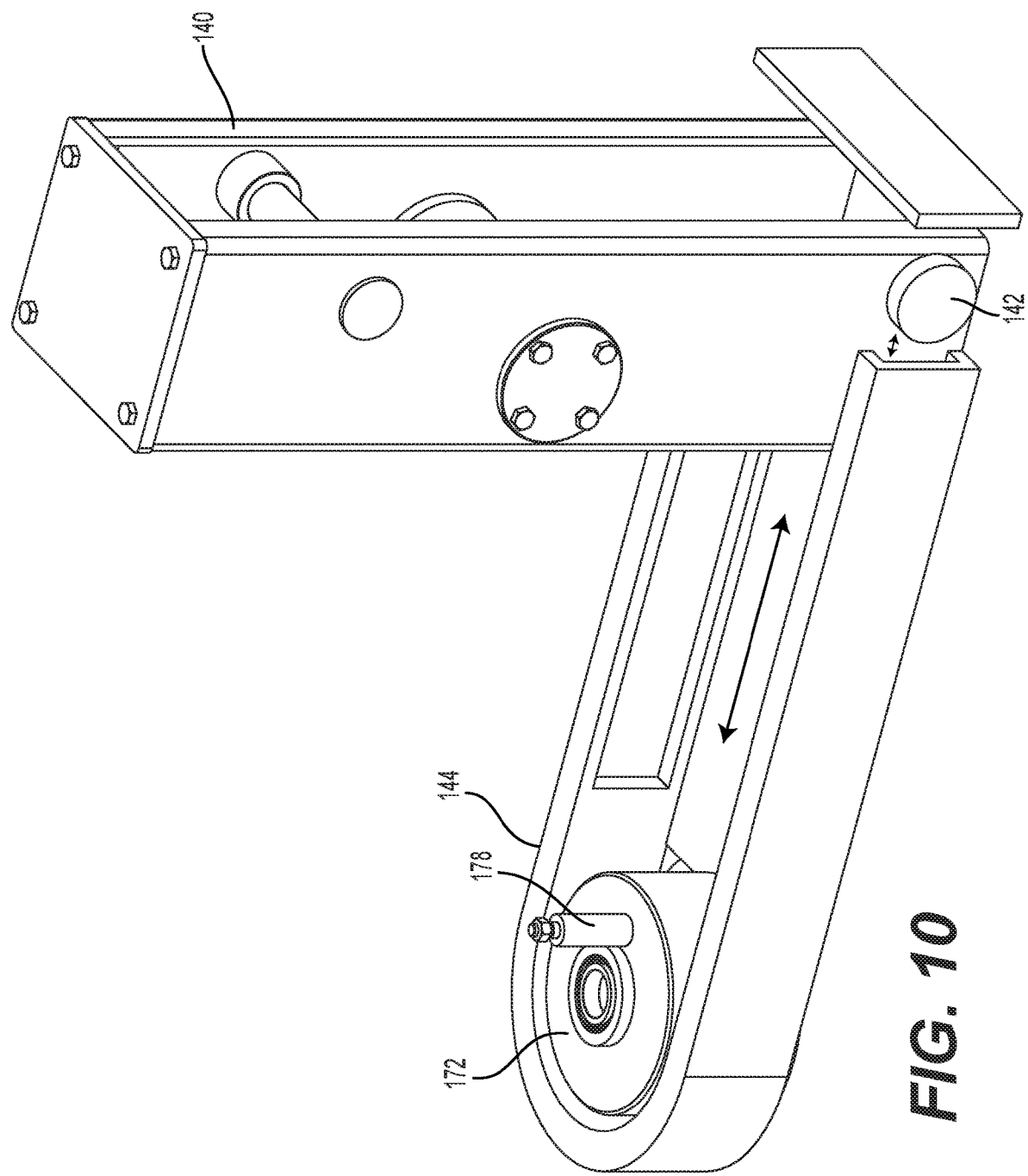
FIG. 10 is a perspective view of an alternative embodiment of the vertical post having rollers mounted in a guide track.

In the alternative embodiment of FIGS. 10 and 11, the vertical post 40, which is directly coupled to the steering rotation synchronizer 74, is replaced by vertical post 140 which is mounted on rollers 142 constrained to travel in a guide track 144 for translation of the vertical post 140. Mating coupler 172 and spring lock pin 178, similar to mating coupler 72 and spring lock pin 78 described above, are disposed at one end of the track 144. The post 140 may be moved in the track 144 to center the post 140 over the mating coupler 172, and the spring lock pin 178 temporarily fixes the vertical post 140 to the mating coupler 172 (and thereby the steering rotation synchronizer 74), disconnecting the motor 116 and permitting manual steering of the wheels 76.

It is to be understood that the mobile work station with versatile tool handler arm is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A mobile work station with versatile tool handler arm, comprising:
    a base housing having a top wall and a bottom wall;
    a vertical post mounted on the base housing, the vertical post having an upper end and a lower end, the vertical post being rotatable with respect to the base housing;
    a tool handler arm pivotally mounted medially on the upper end of the vertical post, the tool handler arm being elongate and having a front end and a rear end, the tool handler arm being defined by a four-bar parallelogram linkage including:
        an upper link bar having a front end and a rear end;
        a lower link bar having a front end and a rear end;
        a rear crank block, the rear ends of the upper and lower link bars being pivotally attached to the rear crank block; and
        a front crank block, the front ends of the upper and lower link bars being pivotally attached to the front crank block;
    a tool carrier coupled to the lower link bar of the tool handler arm, the tool carrier having a coupler adapted for releasably attaching a tool to the front end of the tool handler arm, the lower link bar of the tool handler arm being rotationally mounted in the four-bar parallelogram linkage for rotating the tool when needed, the tool handler arm being pivotal medially to raise and lower the tool as needed;
    a wheel mounting plate disposed in the base housing;
    a plurality of wheels mounted on the wheel mounting plate and extending through the bottom wall of the base housing, whereby the wheels are ground-engaging wheels; and
    a steering assembly at least partially disposed within the base housing, the steering assembly being connected to each of the wheels for simultaneously steering all of the wheels in a common direction at a common speed.

2. The mobile work station as recited in claim 1, wherein the vertical post comprises opposed first and second sidewalls.

3. The mobile work station as recited in claim 1, further comprising three trunnion mounts defining perpendicular axes of rotation, the three trunnion mounts including:
    a first trunnion mount pivotally attaching the rear end of the lower link bar to the rear crank block;
    a second trunnion mount pivotally attaching the front end of the lower link bar to the front crank block; and
    a third trunnion mount pivotally attaching the lower link bar medially to the upper end of the vertical post, the lower link bar extending axially through all three of the trunnion mounts for rotation therein.

4. The mobile work station as recited in claim 1, further comprising a handlebar mounted at the rear end of the tool handler arm.

5. The mobile work station as recited in claim 4, further comprising:
    a first universal joint coupling said handlebar to the rear end of the lower link bar; and
    a second universal joint coupling said tool carrier to the front end of the lower link bar.

6. The mobile work station as recited in claim 1, further comprising a winch mounted at the lower end of said vertical post, the winch having a cable selectively attachable to said tool handler arm between said rear crank block and the upper end of said vertical post for selectively pivoting said tool handler arm to raise and lower the tool attached to said tool carrier.

7. The mobile work station as recited in claim 1, wherein said vertical post further comprises a spring lock pin mounted on the lower end thereof, the mobile work station further comprising a steering rotation synchronizer rotatable above the top wall of the base housing and connected to the steering assembly, the spring lock pin selectively locking said vertical post to the steering rotation synchronizer so that rotation of said vertical post using said tool handler arm as a lever manually steers all of the wheels simultaneously.

8. The mobile work station as recited in claim 1, wherein the steering assembly comprises:
    a plurality of steering yokes, each of the wheels being mounted on a corresponding one of the steering yokes;
    a plurality of electric slip rings, each of the steering yokes having a corresponding one of the slip rings mounted thereon;

a plurality of kingpins, each of the steering yokes having a corresponding one of the kingpins extending therefrom through the corresponding slip ring;

a steering linkage having a plurality of shafts radially extending from a central hub;

a plurality of first crank arms of equal length, each of the first crank arms coupling a corresponding one of the kingpins to a corresponding one of the shafts of the steering linkage;

a motor;

a first gear driven by the motor;

a second gear meshed with, and driven by, the first gear;

a synchronizer shaft eccentrically mounted on the second gear and coupled to the central hub of the steering linkage; and a second crank arm coupling the synchronizer shaft with the steering rotation synchronizer.

9. The mobile work station as recited in claim 8, wherein said wheel mounting plate has a plurality of arms, each of the arms having an opening formed therethrough for at least partially receiving a corresponding one of the plurality of electric slip rings, the second gear being rotatably mounted on the wheel mounting plate.

10. The mobile work station as recited in claim 1, wherein said base housing comprises a plurality of partition walls defining a plurality of compartments therein.

11. The mobile work station as recited in claim 1, wherein said vertical post further comprises rollers and a spring lock pin mounted on the lower end of said vertical post, the mobile work station further comprising:

an elongate track mounted on the top wall of said base housing, the track having guide slots on opposite sides thereof, the rollers at the lower end of said guide post being constrained to roll in the guide slots; and a steering rotation synchronizer mounted in the track at one end of the track, the steering rotation synchronizer being connected to said steering assembly, the spring lock pin selectively locking said vertical post to the steering assembly for manual steering of said wheels;

whereby said tool handler arm is capable of translation in the elongate track with respect to said base housing.

12. A tool handler arm, the tool handler arm being elongate and having a front end and a rear end, the tool handler arm being defined by a four-bar parallelogram linkage including:

an upper link bar having a front end and a rear end;

a lower link bar having a front end and a rear end;

a rear crank block, the rear ends of the upper and lower link bars being pivotally attached to the rear crank block; and a front crank block, the front ends of the upper and lower link bars being pivotally attached to the front crank block;

a vertical post adapted for mounting on a mobile platform, the vertical post having an upper end and a lower end, the tool handler arm being pivotally mounted medially on the upper end of the vertical post and a tool carrier coupled to the lower link bar of the tool handler arm, the tool carrier having a coupler adapted for releasably attaching a tool to the front end of the tool handler arm, the lower link bar of the tool handler arm being rotationally mounted in the four-bar parallelogram linkage for rotating the tool when needed, the tool handler arm being pivotal medially to raise and lower the tool as needed.

13. The tool handler arm as recited in claim 12, wherein the vertical post comprises opposed first and second sidewalls.

14. The tool handler arm as recited in claim 13, further comprising three trunnion mounts defining perpendicular axes of rotation, the three trunnion mounts including:

a first trunnion mount pivotally attaching the rear end of the lower link bar to the rear crank block;

a second trunnion mount pivotally attaching the front end of the lower link bar to the front crank block; and a third trunnion mount pivotally attaching the lower link bar medially to the upper end of the vertical post, the lower link bar extending axially through all three of the trunnion mounts for rotation therein.

15. The tool handler arm as recited in claim 14, further comprising a handlebar mounted at the rear end of the tool handler arm.

16. The tool handler arm as recited in claim 15, further comprising:

a first universal joint coupling said handlebar to the rear end of the lower link bar; and a second universal joint coupling said tool carrier to the front end of the lower link bar.

17. The tool handler arm as recited in claim 16, further comprising a winch mounted at the lower end of said vertical post, the winch having a cable selectively attachable to said tool handler arm between said rear crank block and the upper end of said vertical post for selectively pivoting said tool handler arm to raise and lower the tool attached to said tool carrier.

* * * * *